United States Patent
Pollnow et al.

(10) Patent No.: US 9,774,516 B2
(45) Date of Patent: Sep. 26, 2017

(54) TRACE ROUTE COMMAND EXECUTION FROM A VIRTUALIZED ENVIRONMENT

(75) Inventors: William O. Pollnow, Shoreview, MN (US); Allyn Smith, Shoreview, MN (US); James R. Heit, Vadnais Heights, MN (US); Dennis Stroik, Columbia Heights, MN (US)

(73) Assignee: Unisys Corporation, Blue Bell, PA (US)

( * ) Notice: Subject to any disclaimer, the term of this patent is extended or adjusted under 35 U.S.C. 154(b) by 321 days.

(21) Appl. No.: 13/604,785

(22) Filed: Sep. 6, 2012

(65) Prior Publication Data

US 2014/0068054 A1 Mar. 6, 2014

(51) Int. Cl.
  *G06F 15/173* (2006.01)
  *H04L 12/26* (2006.01)

(52) U.S. Cl.
  CPC .............. *H04L 43/12* (2013.01); *H04L 43/10* (2013.01)

(58) Field of Classification Search
  CPC ... H04L 63/08; H04L 41/12; H04L 29/08144; H04L 45/00
  See application file for complete search history.

(56) References Cited

U.S. PATENT DOCUMENTS

| | | | | |
|---|---|---|---|---|
| 2007/0280244 A1* | 12/2007 | Kikuchi | ............... | H04L 43/0811 370/392 |
| 2010/0235830 A1* | 9/2010 | Shukla | ................ | G06F 9/44526 718/1 |
| 2011/0299406 A1* | 12/2011 | Vobbilisetty | ............ | H04L 43/10 370/248 |
| 2012/0063331 A1* | 3/2012 | Miyazaki | ................ | H04L 12/18 370/248 |
| 2012/0113817 A1* | 5/2012 | Fitzgerald | ............... | H04L 43/10 370/248 |

OTHER PUBLICATIONS

Eddie et al.—Parallels Forum—"Problem running tracert in windows 2000 VM" May 18, 2009.*
Nicoara "Traceroute from Ubunto just shows first and last hops on VM Player 3.1.4" Apr. 26, 2011.*
Arora et al. "UNIX / Linux Traceroute Command Examples" The Geek Stuff—May 9, 2012.*
Eddie et al. Parallels Forum—Problem running tracert in windows 2000 vm—May 18, 2009.*
Nicoara traceroute from Ubunto just shows firs and last hops on VM player 3.1.4 Apr. 26, 2011.*

* cited by examiner

*Primary Examiner* — Younes Naji
(74) *Attorney, Agent, or Firm* — Robert P. Marley; Richard J. Gregson

(57) ABSTRACT

A traceroute command may be used to diagnose a computer network or provide additional information regarding a computer network. A traceroute command may be provided to applications executing within a virtualized environment by allowing commands to be passed from the virtualized environment to a host operating system through a network interface. The traceroute command may be executed by the host operating system, and network information returned to the application in the virtualized environment.

17 Claims, 7 Drawing Sheets

300

302 304 306 308 310

1 9 ms <1 ms <1 ms Source-host-1 [192.168.1.1]
2 1 ms <1 ms <1 ms 192.168.3.1
3 1 ms <1 ms <1 ms Hop-x [192.168.3.2]
4 16 ms 14 ms 13 ms Hop-y [172.16.172.1]
5 9 ms 11 ms 10 ms Destination-1 [172.16.172.16]

Trace complete.

TRACE ROUTE COMMAND EXECUTION FROM A VIRTUALIZED ENVIRONMENT

FIELD OF THE DISCLOSURE

The instant disclosure relates to computer network. More specifically, this disclosure relates to diagnosing and testing computer networks.

BACKGROUND

Conventional operating systems make a "traceroute" command available to applications. The "traceroute" command may determine a path to a network destination. Such a command may be useful for diagnosing connection problems. FIG. 1 is a block diagram illustrating a conventional trace route command. An application on a source computer 102 of a network 100 may communicate with a destination computer 112. When the network 100 is a packet-based network, such as the Internet, the path packets travel from the source computer 102 to the destination computer 112 is usually unknown. For example, a packet may travel between a node 104, a node 106, a node 108, and a node 110. When transmission of a data packet from the source computer 102 to the destination computer 112 fails, identifying the nodes 104-110 may assist in determining the cause of the transmission failure.

However, when a virtualized environment is created in the operating system the "traceroute" command of the operating system may not be available to applications within the virtualized environment. For example, another operating system, which does not provide a "traceroute" command may run in the virtualized environment.

SUMMARY

Applications in the virtualized environment may benefit from access to a function for tracing a route to a destination computer.

According to one embodiment, a method includes receiving a user command to execute a trace route in a virtualized environment. The method further includes building a command string corresponding to the user command. The method also includes transmitting the command string to a network interface for execution outside of the virtualized environment. The method also includes receiving, from outside of the virtualized environment, results of the command string. The method further includes outputting, in the virtualized environment, the results of the command string.

According to another embodiment, a computer program product includes a non-transitory computer readable medium having code to receive a user command to execute a trace route in a virtualized environment. The medium may also include code to build a command string corresponding to the user command. The medium may further include code to transmit the command string to a network interface for execution outside of the virtualized environment. The medium may also include code to receive, from outside of the virtualized environment, results of the command string. The medium may further include code to output, in the virtualized environment, the results of the command string.

According to yet another embodiment, an apparatus includes a memory and a processor coupled to the memory. The processor is configured to receive a user command to execute a trace route in a virtualized environment. The processor is also configured to build a command string corresponding to the user command. The processor is further configured to transmit the command string to a network interface for execution outside of the virtualized environment. The processor is also configured to receive, from outside of the virtualized environment, results of the command string. The processor is further configured to output, in the virtualized environment, the results of the command string.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
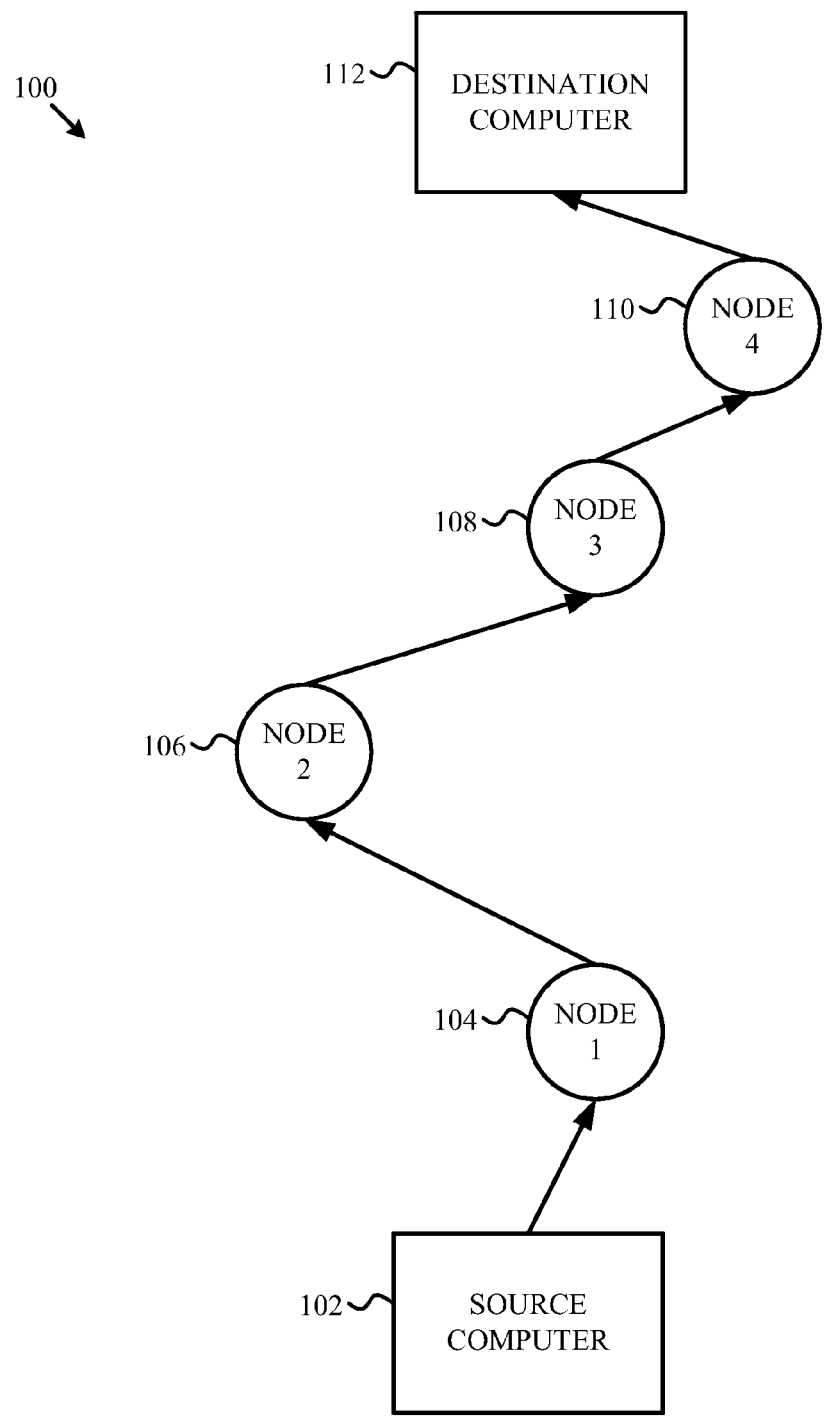
FIG. 1 is a block diagram illustrating a conventional trace route command.

Tracing a route between a source and a destination computer may provide useful diagnostic information regarding a computer network. For example, when communications between two computers are interrupted, a trace route command may be issued to identify a path between the two computers and locate any problems on the path.

A user command to begin a trace route may be "traceroute" followed by a number of key-value pairs identifying parameters for the trace route command. For example, one key-value pair may be a "HOST, destination" pair, where destination is replaced with an actual computer name or address to trace the route to. The user command may accept a valid destination address for the HOST parameter, such as an internet protocol (IP) address or a domain name.

In another example, a "HOPS, #" pair may specify a maximum number of hops allowed to the specified destination. If there is a HOPS keyword, the number that follows may specify a maximum number of stops allowed during the trace. The number may be less than or equal to 255 and greater than 0. If a "HOPS, #" pair is not appended to the user command, then a default of 30 hops may be used.

In yet another example, a "WAIT, #" pair may specify a number of seconds to timeout any individual hop in the trace route. If a "WAIT, #" pair is not appended to the user command, then a default of 5 seconds may be used.

In a further example, a "LOCAL-IP, {IPV4|IPV6|addr}" pair may specify whether to use a IPv4 address, a IPv6 address, or specific local IP addresses in the execution of the trace route user command.

In yet another example, a "NAMES, OFF" pair may specify to the computer system to not resolve IP addresses to domain names during execution of the trace route user command. If "NAMES, OFF" is not appended to the user command, then the address may be resolved to domain names by default.

In another example, a "PROTOCOL, {UDP|ICMP}" pair may specify whether to use a user datagram packet (UDP) or an internet control message protocol (ICMP) message to execute the trace route. If the "PROTOCOL" name-value pair is not appended to the trace route user command, then the UDP protocol may be used during execution of the trace route command by default.

In a further example, a "PORT, #" pair may specify a particular port to contact on the destination computer. If the "PORT, #" pair is not appended to the trace route user command, then a default port of 33434 may be used.

In another example, a "PROBES, #" pair may be appended to the user command to specify a number of probes to issue for detecting a node in the path to the destination computer. If the number of probes is not specified when the trace route user command executes, a default of three probes may be used.

Although the parameters for execution of a trace route command are described as name-value pairs above. The values for the parameters of the trace route user command may also be specified through other formats. For example, the parameters may be specified in a file contained in a current working directory of the trace route user command. In another example, the parameters may be specified in a registry of the operating system executing the trace route user command.

Figure 2:
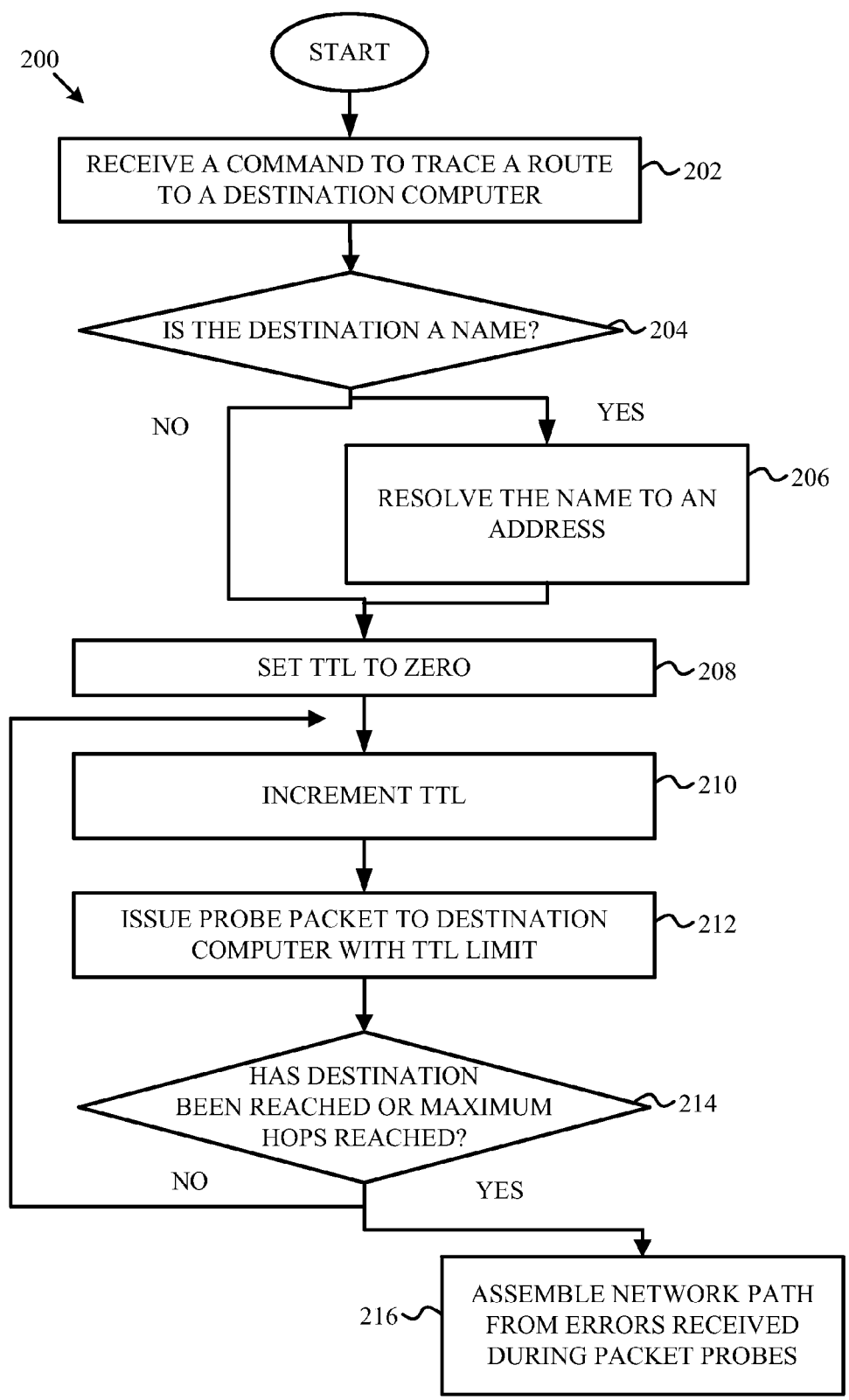
FIG. 2 is a flow chart illustrating execution of a trace route command according to one embodiment.

FIG. 2 is a flow chart illustrating execution of a trace route command according to one embodiment. A method 200 starts with receiving a command to trace a route to a destination computer at block 202. The command may be received from an application executing inside a virtualized environment of the host computer system through a network interface. The command received at block 202 may be formatted with name-value pairs as described above.

At block 204, it is determined whether the destination is a host name. If so, the name is resolved to an address at block 206. Then, the method 200 proceeds to block 208. If the destination is not a host name at block 204, then the method 200 may proceed to block 208.

At block 208, a time to live (TTL) counter is initialized to zero. At block 210 the TTL counter is incremented to one, and at block 212 a probe packet to the destination is issued with the TTL limit of block 210. That is, on a first execution of the block 212, a probe packet with a TTL of one is issued. The first node, such as a router, that receives the datagram transmitted by the probe packet may return a time exceeded ICMP error, because the datagram exceeded the TTL limit.

After ICMP or UDP returns an error, the IP address that reported the error may be stored along with the delay time for the error to return after the probe packet was issued at block 212. Probe packets issued at block 212 may be repeated one or more times before proceeding to block 214 and returning to blocks 210 and 212. For example, multiple probes may be transmitted for each TTL value in the method of 200. The probes may be transmitted in series, such that after a probe finishes the next probe may be issued. According to one embodiment, each probe may have a different port number. For example, the remote port number in the issued probe packet of block 212 may be incremented by one for each probe at a TTL value. The port number may return to the number specified in the user command at block 202 for each new TTL value.

At block 214, it is determined whether the destination computer has been reached or a maximum number of hops, specified at block 202, have been reached. If not, the method 200 returns to block 210 to increment the TTL counter at block 210 and issue a probe packet with the incremented TTL counter at block 212. The series of blocks 210, 212, and 214 may be repeated to identify the second router and succeeding routers in the path to the destination computer. Alternatively, the block 214 may end the repetition of blocks 210, 212, and 214 when the TTL counter exceeds a specified maximum number of hops, even when the destination is not reached. A destination computer may be determined to be reached when a port inactive error is received during execution of the probe packet at block 212.

At block 216, the network path to the destination is assembled from the ICMP errors received from each of the probe packets issued at block 212. Each of the probe packets may be timed and the results may be output to a file and/or a display.

Figure 3:
FIG. 3 is an output illustrating the results of a trace route command according to one embodiment.

FIG. 3 is an output illustrating the results of a trace route command according to one embodiment. An output 300 may include columns 302, 304, 306, 308, and 310. Column 302 includes a TTL value of the probe packet generating the results in each row of the output 300. Columns 304, 306, and 308 include the delay time between sending a probe packet and receiving a response for each probe. In the display 300, three probe packets are sent for each TTL value and the three delay times are provided in columns 304, 306, and 308. In other embodiments, different number of probe packets may be issued for each TTL value. Thus, there may be additional or fewer columns displaying delay times for each TTL value. Column 310 displays the intermediate host that generated the ICMP error in response to the probe packet. The list of hosts in column 310 may be used to construct the network path to the destination host. The output 300 may be generated as the probe packets complete. The output 300 may also be compiled by the host system and returned to the user in the virtualized environment after the sequence of FIG. 2 has completed.

If the "NAMES, OFF" parameter described above was specified in the user command at block 202, then the output 300 of FIG. 3 may include lines without domain names as in "1. 9 ms<1 ms<1 ms 192.168.1.1." If the NAMES parameter was not specified, then a DNR request may be performed for each address in the output 300 to obtain a symbolic name associated with the IP address. The name may be included in the output 300 of FIG. 3 as in "1. 9 ms<1 ms<1 ms Source-host-1[192.168.1.1]."

Figure 4:
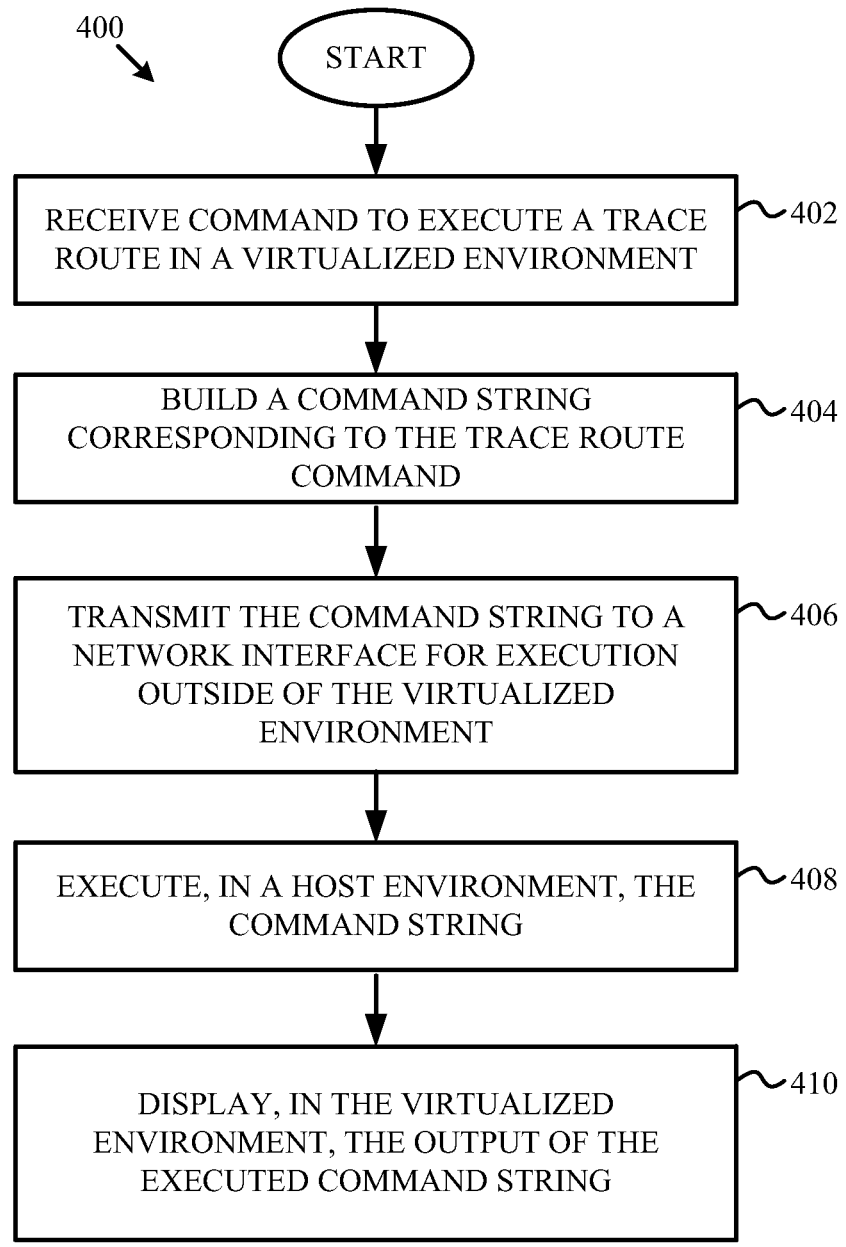
FIG. 4 is a flow chart illustrating a method of executing a trace route command in a virtualized environment.

FIG. 4 is a flow chart illustrating a method of executing a trace route command in a virtualized environment. A method 400 may begin at block 402 with receiving a user command to execute a trace route in a virtualized environment. At block 404, a command string may be constructed corresponding to the trace route command received at block 402. The command string may be constructed for execution in a Linux operating system.

One example of the command string built at block 404 may be "traceroute -m 16 -4 -i 192.168.1.1 www.google.com," which instructs a host operating system to trace the path to GOOGLE with a maximum of 16 hops using IPv4 addresses and a local interface of 192.168.1.1. Possible parameters for the traceroute command may include "-4" or "-6" for IPv4 or IPv6 requests, "-n" for "NAMES, OFF," "-m" for setting a maximum number of hops, "-i" for setting a source address to use, "-w" for setting a timeout value, "-q" for setting a number of probes, and "-u" for specifying use of the UDP protocol. The parameters of the command string may correspond to those of the user command with name-value pairs described above.

At block 406, the command string is transmitted from the virtualized environment to a network interface for execution outside of the virtualized environment. For example, the command string may be queued through an event to a network interface that processes the string on the Linux platform through a user sail commando routine.

According to one embodiment, the command initiating activity in the host operating system may not wait for termination. At block 408, the command string is executed by the host environment. When the host operating system finishes the command, the host operating system may send a completion event to the network interface. Then, the output from the traceroute command may be sent to the virtualized environment and stored in a data file or output to a terminal. At block 410, the output may be displayed within the virtualized environment. An application executing in the virtualized environment may reformat the returned image in a form suitable for a message handler in the virtualized environment.

Although passing a "traceroute" command from a virtualized environment to a network interface for execution by a host operating system is described above, the method of FIG. 4 may be applied to other commands available in the host operating system but not available within the virtualized environment.

Figure 5:
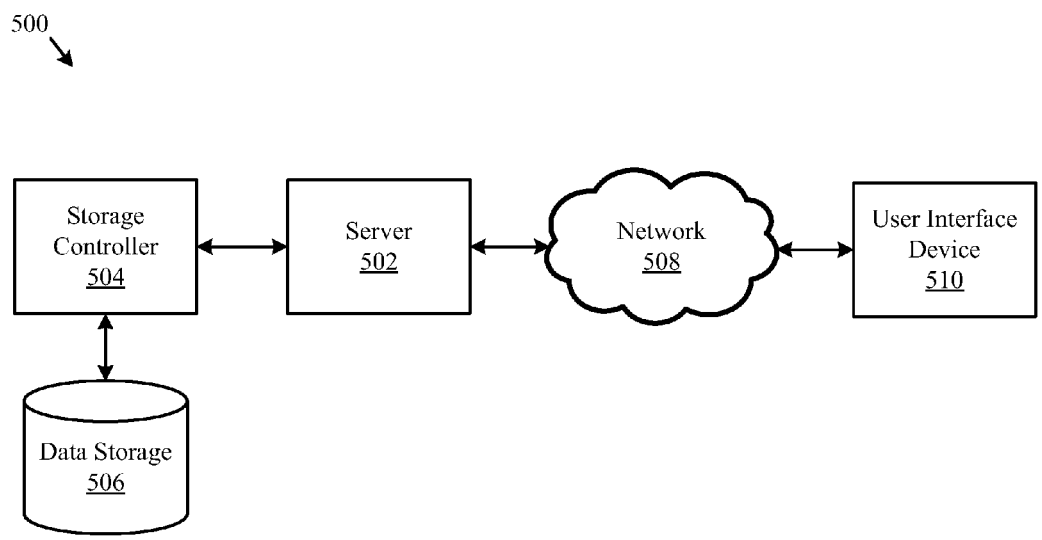
FIG. 5 is a block diagram illustrating a computer network according to one embodiment of the disclosure.

FIG. 5 illustrates one embodiment of a system 500 for an information system, including a system for hosting applications in virtualized environments. The system 500 may include a server 502, a data storage device 506, a network 508, and a user interface device 510. The server 502 may be a dedicated server or one server in a cloud computing system. The server 502 may also be a hypervisor-based system executing one or more guest partitions. In a further embodiment, the system 500 may include a storage controller 504, or storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other a mobile communication device having access to the network 508. When the device 510 is a mobile device, sensors (not shown), such as a camera or accelerometer, may be embedded in the device 510. When the device 510 is a desktop computer the sensors may be embedded in an attachment (not shown) to the device 510. In a further embodiment, the user interface device 510 may access the Internet or other wide area or local area network to access a web application or web service hosted by the server 502 and provide a user interface for enabling a user to enter or receive information.

The network 508 may facilitate communications of data, such as probe packets, between the server 502 and the user interface device 510. The network 508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 510 accesses the server 502 through an intermediate server (not shown). For example, in a cloud application the user interface device 510 may access an application server. The application server may fulfill requests from the user interface device 510 by accessing a database management system (DBMS). In this embodiment, the user interface device 510 may be a computer or phone executing a Java application making requests to a JBOSS server executing on a Linux server, which fulfills the requests by accessing a relational database management system (RDMS) on a mainframe server.

Figure 6:
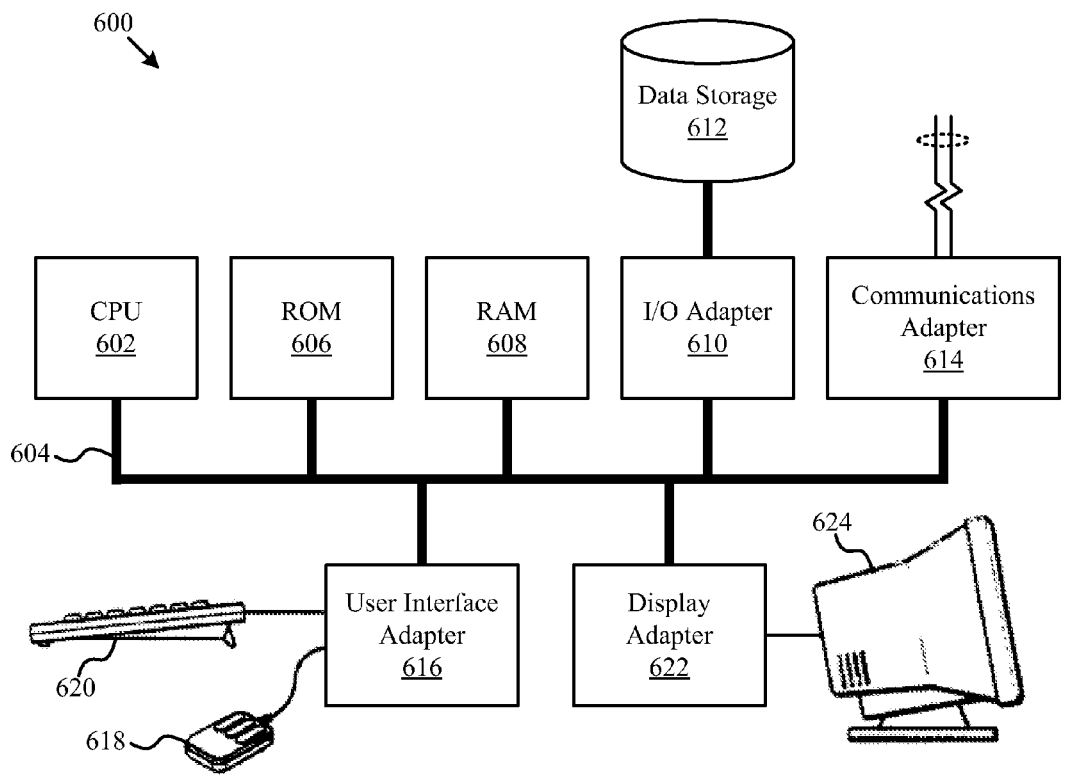
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 508, which may be one or more of a LAN, WAN, and/or the Internet. The communications adapter 614 may also be adapted to couple the computer system 600 to other networks such as a global positioning system (GPS) or a Bluetooth network. The user interface adapter 616 couples user input devices, such as a keyboard 620, a pointing device 618, and/or a touch screen (not shown) to the computer system 600. The keyboard 620 may be an on-screen keyboard displayed on a touch panel. Additional devices (not shown) such as a camera, microphone, video camera, accelerometer, compass, and or gyroscope may be coupled to the user interface adapter 616. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of the server 502 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

Figure 7A:
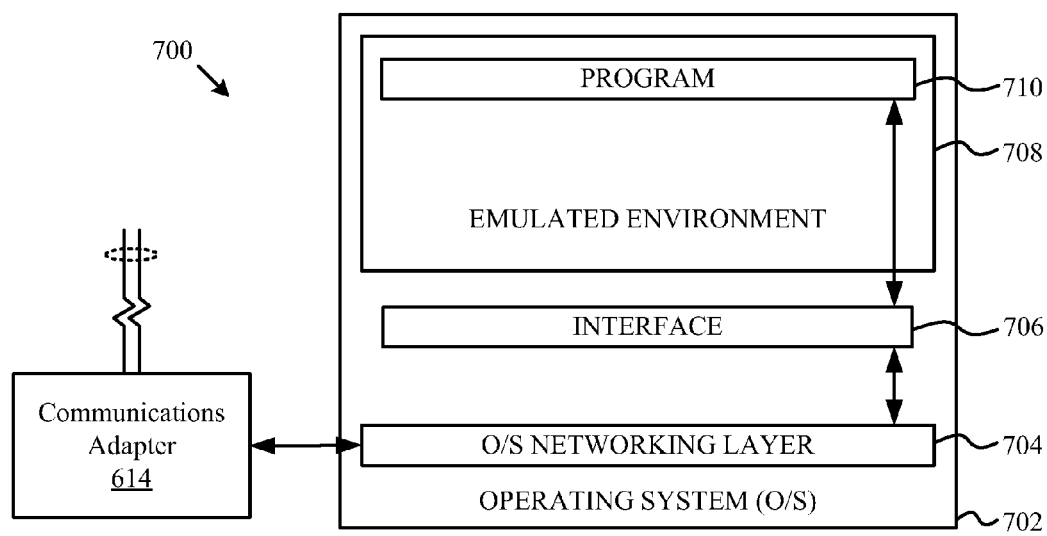
FIG. 7A is a block diagram illustrating a server hosting an emulated software environment for virtualization according to one embodiment of the disclosure.

FIG. 7A is a block diagram illustrating a server hosting an emulated software environment for virtualization according to one embodiment of the disclosure. An operating system 702 executing on a server includes drivers for accessing hardware components, such as a networking layer 704 for accessing the communications adapter 614. The operating system 702 may be, for example, Linux. An emulated environment 708 in the operating system 702 executes a program 710, such as CPCommOS. The program 710 accesses the networking layer 704 of the operating system 702 through a non-emulated interface 706, such as XNIOP. The non-emulated interface 706 translates requests from the program 710 executing in the emulated environment 708 for the networking layer 704 of the operating system 702.

Figure 7B:
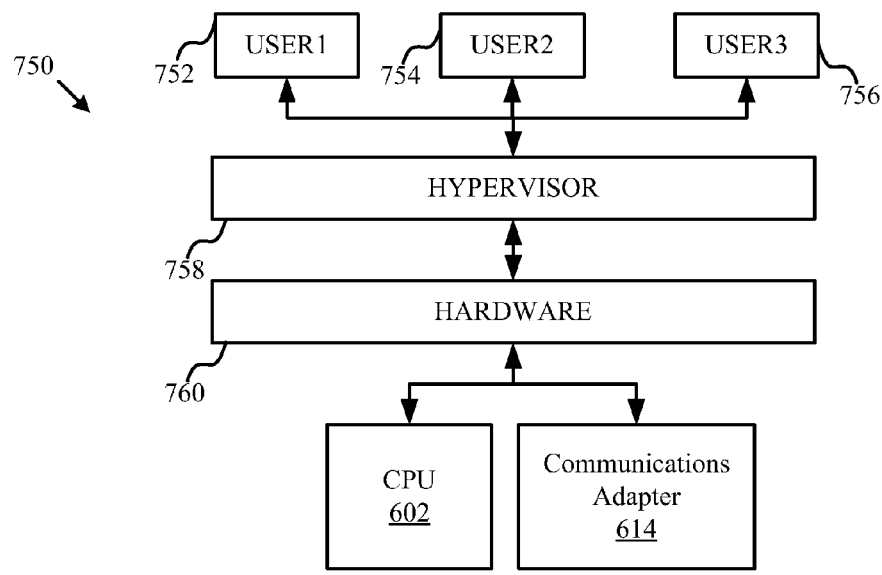
FIG. 7B is a block diagram illustrating a server hosting an emulated hardware environment according to one embodiment of the disclosure.

In another example, hardware in a computer system may be virtualized through a hypervisor. FIG. 7B is a block diagram illustrating a server hosting an emulated hardware environment according to one embodiment of the disclosure. Users 752, 754, 756 may access the hardware 760 through a hypervisor 758. The hypervisor 758 may be integrated with the hardware 760 to provide virtualization of the hardware 760 without an operating system, such as in the configuration illustrated in FIG. 7A. The hypervisor 758 may provide access to the hardware 760, including the CPU 602 and the communications adaptor 614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving, in a virtualized environment, a user command to execute a trace route in the virtualized environment, wherein the user command includes a maximum number of hops, a source host address and a destination host address;
   building, in the virtualized environment, a trace route command string corresponding to the user command;
   transmitting the trace route command string to a network interface for execution in a host environment outside of the virtualized environment;
   executing the trace route command string in the host environment outside of the virtualized environment;
   receiving, from the host environment outside of the virtualized environment, results of the trace route command string; and
   outputting, in the virtualized environment, the results of the trace route command string, wherein the results of the trace route command string includes the source host address, the destination host address and the maximum number of hops that are used to construct a network path between a source host and a destination host.

2. The method of claim 1, wherein the virtualized environment allows a user to set a maximum number of probes in the user command.

3. The method of claim 1, in which executing the trace route command string comprises transmitting a plurality of probe packets.

4. The method of claim 3, further including increasing time to live (TTL) values, if the maximum number of hops has not been reached.

5. The method of claim 1, further comprising receiving a completion event from the network interface when the trace route is complete.

6. The method of claim 4, in which the time to live (TTL) values begin at zero.

7. A computer program product, comprising:
a non-transitory computer readable medium comprising:
code to receive, in a virtualized environment, a user command to execute a trace route in the virtualized environment, wherein the user command includes a maximum number of hops, a source host address and a destination host address;
code to build, in the virtualized environment, a trace route command string corresponding to the user command;
code to transmit the trace route command string to a network interface for execution in a host environment outside of the virtualized environment;
code to execute the trace route command string in the host environment outside of the virtualized environment;
code to receive, from the host environment outside of the virtualized environment, results of the trace route command string; and
code to output, in the virtualized environment, the results of the trace route command string, wherein the results of the trace route command string includes the source host address, the destination host address and the maximum number of hops that are used to construct a network path between a source host and a destination host.

8. The computer program product of claim 7, wherein the virtualized environment allows a user to set a maximum number of probes in the user command.

9. The computer program product of claim 7, in which the medium further comprises code to transmit a plurality of probe packets.

10. The computer program product of claim 9, in which the medium further comprises code to increase time to live (TTL) values, if the maximum number of hops has not been reached.

11. The computer program product of claim 7, in which the medium further comprises code to receive a completion event from the network interface when the trace route is complete.

12. The computer program product of claim 10, in which the time to live (TTL) values begin at zero.

13. An apparatus, comprising:
a memory; and
a processor coupled to the memory, in which the processor is configured:
to receive, in a virtualized environment, a user command to execute a trace route in the virtualized environment, wherein the user command includes a maximum number of hops, a source host address and a destination host address;
to build, in the virtualized environment, a trace route command string corresponding to the user command;
to transmit the trace route command string to a network interface for execution in a host environment outside of the virtualized environment:
to execute the trace route command string in the host environment outside of the virtualized environment;
to receive, from the host environment outside of the virtualized environment, results of the trace route command string; and
to output, in the virtualized environment, the results of the trace route command string, wherein the results of the trace route command string includes the source host address, the destination host address and the maximum number of hops that are used to construct a network path between a source host and a destination host.

14. The apparatus of claim 13, wherein the virtualized environment allows a user to set a maximum number of probes in the user command.

15. The apparatus of claim 13, in which the processor is further configured to increase time to live (TTL) values, if the maximum number of hops has not been reached.

16. The apparatus of claim 13, in which the processor is further configured to receive a completion event from the network interface when the trace route is complete.

17. The apparatus of claim 15, in which the time to live (TTL) values begin at zero.

* * * * *